July 24, 1956 F. L. JOHNSON ET AL 2,756,286

FREQUENCY SELECTIVE SIGNAL AMPLIFIER

Filed June 24, 1948 2 Sheets-Sheet 1

Inventor

F. L. Johnson

K. W. McLoad

By M. O. Hayes

Attorney

July 24, 1956 F. L. JOHNSON ET AL 2,756,286

FREQUENCY SELECTIVE SIGNAL AMPLIFIER

Filed June 24, 1948

2 Sheets-Sheet 2

Inventors
F. L. Johnson
K. W. McLoad

By M. C. Hayes

Attorney

United States Patent Office 2,756,286

Patented July 24, 1956

2,756,286

FREQUENCY SELECTIVE SIGNAL AMPLIFIER

Ford L. Johnson, Ridley Park, Pa., and Kenneth W. McLoad, Dallas, Tex.

Application June 24, 1948, Serial No. 34,996

8 Claims. (Cl. 179—171)

(Granted under Title 35, U. S. Code (1952), sec. 266)

This invention relates to a new and improved method and apparatus for frequency selective A.-C. signal amplification. More particularly the invention contemplates the method of amplification in which there is employed a reed or other mechanical element adapted to be set in vibration by a magnetic field set up by an A.-C. voltage of predetermined frequency, the vibrating element having coupled thereto apparatus for frequency modulating a source of oscillations. A suitable demodulating circuit energized from the oscillator provides an output voltage varying in amplitude at the same frequency of the signal which is to be amplified.

The subject invention is suitable for use with voltages of a wide range of frequencies and is particularly well adapted for obtaining unusually high amplification and selectivity for voltages of frequencies in the region of 100 C. P. S. and below, where difficulties in filtering are usually encountered as a result of the large size of filter components, especially when filtering of a degree requiring high Q's in the inductive elements of the filter is required. The instant invention also provides amplifying apparatus characterized by freedom from overloading as a result of input signal peaks of short duration.

The apparatus of the instant invention provides a high degree of selectivity for signals of low frequencies. The apparatus also employs components of small size and light weight and is particularly well adapted for use in naval ordnance applications where weight and size must be maintained at a low value and in which it is desirable to provide frequency selective voltage amplification such, for example, as the system disclosed and claimed in the application for Submerged Body Detection System by E. N. Shawhan et al., Serial Number 489,726, filed June 4, 1943.

The apparatus is also particularly well adapted for use in locating equipment of the type in which a beam of low frequency energy is directed at a target, and a portion of the energy reflected back to the source, where it is amplified, filtered to remove extraneous energy components, and applied to indicating apparatus. The apparatus may also be advantageously employed for measuring the speed of rotation of ships' propellers.

One of the objects of the invention is to provide a new and improved selective A.-C. voltage amplifier adapted for use at low frequencies of the order of 100 c. p. s. and below.

Another object of the invention is to provide new and improved apparatus for electrostatically coupling a vibrating reed or other vibrating element to an electrical circuit.

Another object is to provide a novel method of frequency modulating an oscillator by a vibrating mechanical element.

A further object of the invention is to provide a new and improved circuit arrangement for frequency modulating an oscillator by a vibrating element.

A still further object of the invention is to provide an electrical system in which an oscillator is modulated in response to a mechanical element vibrating at the frequency of an input A.-C. voltage which is to be amplified, the output of the oscillator being demodulated to obtain an output voltage of the same frequency as the input voltage and increased in amplitude.

Still a further object of the invention is to provide a new and improved method of obtaining selective voltage amplification.

Still a further object is to provide a selective A.-C. signal amplifier suitable for use at low frequencies and in which the elements required for obtaining selectivity are compact and of light weight.

Other objects, advantages, and improvements not specifically set forth hereinbefore will be apparent after a consideration of the following description, taken in conjunction with the accompanying drawings, in which.

Figure 1:
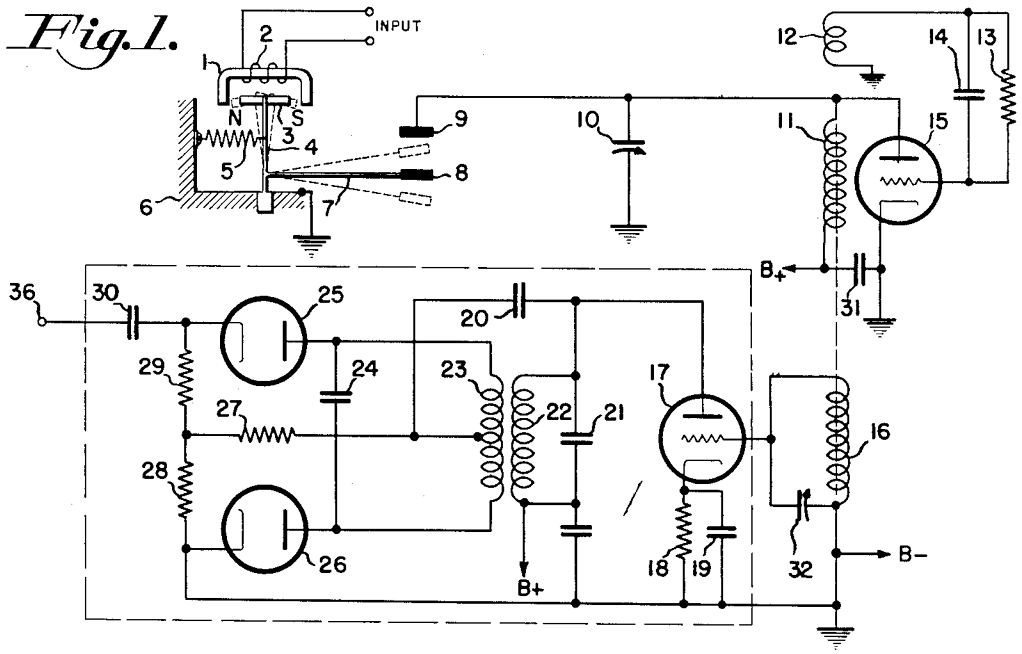
Fig. 1 is a schematic electrical circuit diagram of a preferred embodiment of new and improved apparatus suitable for use with the invention.

Referring now to the drawings, in which like numerals are used throughout to designate like parts, and in particular to Fig. 1 thereof, there is shown thereon a polarized magnetic element 3 adapted to be set in vibratory motion when core or shoe magnet 1 is energized from winding 2 by the application thereto from the input circuit of an electrical signal which has a frequency of predetermined value to cause vibration, as will be hereinafter more fully explained. Attached to and supporting member 3 is a bar or vibratory reed 4 having the end thereof fixed by any suitable means in a rigid supporting mass 6. Attached to and adapted to vibrate with bar 4 is a rigid member 7 of any suitable design carrying disposed near the end thereof, a plate of metal 8 disposed near a stationary plate 9 and adapted to form therewith an electrical capacitor, for reasons to be subsequently explained. Spring means 5 for limiting and controlling the vibratory motion of bar 4 may be provided if desired.

The member 3 is set in oscillatory or vibratory motion between the poles of shoe magnet 1 only when the frequency of the A.-C. voltage impressed between the input terminals is substantially the same as the natural resonant frequency of the vibratory system comprising elements 3—8, which natural resonant frequency may be readily ascertained in any suitable manner by those skilled in the art. Means, not shown, may be provided, if desired, for adjusting the natural resonant frequency of vibration of the system 3—8, for example, an adjustable weight may be mounted on either or both of the members 4 and 7.

It will be understood, also, by those skilled in the art, that once the system has been set in vibration by an exciting voltage of predetermined frequency applied to the coil 2, the effects of harmonics and other distortions of the wave form of the input voltage on the frequency of vibration of the moving elements 3—8 will be negligible. Furthermore, the vibrating system is highly selective as to exciting frequency, so that only an A.-C. signal of substantially the natural resonant frequency will excite the moving system.

At 15, Fig. 1, is shown an oscillator tube 15, which may be a triode or any other convenient type, connected in an oscillatory circuit which may be of conventional design, and includes inductance 12 in the grid circuit and inductance 11 in the plate circuit, these inductances being inductively coupled together to provide for feeding back a portion of the A.-C. energy in the plate circuit into the grid circuit in order to maintain oscillations. Grid leak 13 and bypass capacitor 14 complete the grid circuit.

Capacitor 10 is effectively in parallel with the plate inductance 11, the value of the bypass or filter capacitor 31 being substantially greater, and preferably several times greater, than the value of capacitor 10, which latter capacitor serves as the main tuning capacitor for controlling the frequency of oscillations in tube 15. It is noted that one set of plates of condenser 10 is connected to ground, and that plate 8 is at ground potential, and further, that plate 9 is connected to the high potential terminal of capacitor 10, so that capacitor 10 and the capacitor formed by plates 8 and 9 are connected in parallel.

As a result of the aforedescribed circuit arrangement, while the vibrating system including plate 8 is in motion, the frequency of oscillations in tube 15 is varied periodically within limits controlled by the oscillator frequency and the relation of the capacity of plates 8 and 9 to the total capacity in the circuit, the variations in frequency being at a rate corresponding to the rate of vibration of bar 4 and plate 8.

Inductively coupled to inductor 11 to receive power therefrom is a tuned circuit containing inductor 16 and capacitor 32, the voltage developed in this circuit being supplied to the grid of tube 17, which may be a triode of any convenient type and which serves as a limiter, the operation thereof for this purpose being conventional and well known to those skilled in the art and provides a constant amplitude signal for application to the discriminator presently to be described. Cathode resistor 18 bypassed by capacitor 19 provides bias, the tube 17 maintaining a constant output for variations of voltage in its grid circuit above a predetermined minimum. The voltage output from limiter tube 17 is developed across the impedance of the tuned anode circuit including inductor 22 and capacitor 21.

Tubes 25 and 26 comprise a demodulator which may be of the conventional discriminator type employed in frequency modulation receivers of commercial design. The inductor 23 is coupled to inductor 22 to receive power therefrom, is tuned by capacitor 24, and has the ends thereof connected to the anodes of a pair of rectifier tubes 25 and 26 which are preferably diodes but may be any other convenient type. The center tap of inductor 23 is connected by way of capacitor 20 to the anode of tube 17, and the center tap is further connected by way of resistor 27 to the junction between resistors 28 and 29, which are preferably of equal value. The cathode of tube 26 is connected to the other end of resistor 28 and to ground, the other end of resistance 29 being connected to the cathode of tube 25, and also to an output coupling capacitor 30. The output voltage is developed across resistors 28 and 29 to ground.

The operation of the frequency discriminator circuit of tubes 25 and 26 is conventional. When the voltage across secondary 23 is unmodulated, the voltages applied to the anodes of diodes 25 and 26 at any instant are equal but opposite in polarity, and the voltages set up across resistors 28 and 29 therefore are equal and opposite, so that there is no resulting voltage drop between capacitor 30 and ground. When, however, the oscillator frequency changes in response to movement of plate 8, one of the voltages applied to the diodes lags behind the other, due to the action of capacitor 20. Therefore, at a given moment in a cycle of the oscillator voltage, the voltage on one of the diode plates is greater than the voltage on the other, and the instant output voltage between capacitor 30 and ground is the difference between the voltages across resistors 28 and 29. The output voltage at 30 will be positive or negative with respect to ground depending upon whether the frequency of the oscillator is varied above or below its unmodulated value.

There is developed accordingly, an output voltage at capacitor 30 between terminal 36 and ground which is varying in amplitude at a rate corresponding to the rate of vibration of plate 8 and bar 4, and at the frequency of the input voltage energizing coil 2, the input voltage being of the frequency which it is desired to amplify. By suitable choice of circuit components, linearity of the various circuits is obtained and the voltage appearing at capacitor 30 is substantially a sine wave, of the frequency of the input voltage, and increased in amplitude.

Figure 2:
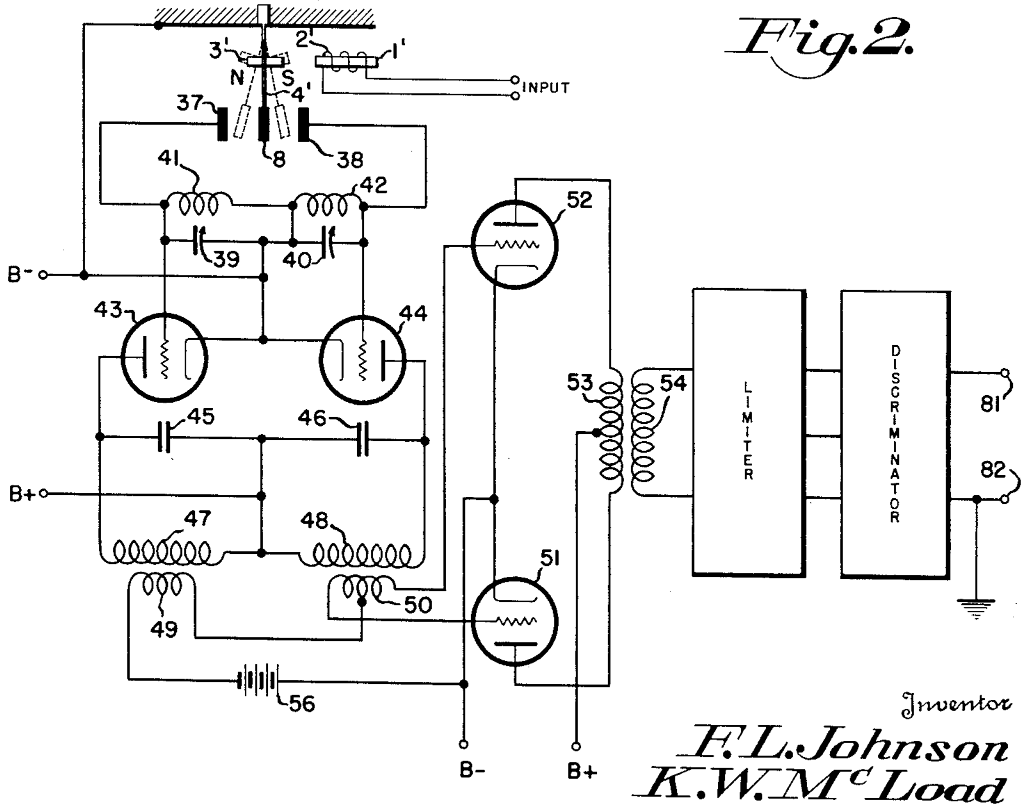
Fig. 2 is a schematic electrical circuit diagram of a modification of the apparatus of Fig. 1.

Reference is made now to Fig. 2 in which is shown a modification of the circuit of Fig. 1, in which a pair of oscillators connected in push-pull arrangement are employed. It is to be noted that the oscillating plate 8 attached to the vibrating rod 4′ is normally disposed substantially midway between plates 37 and 38, these plates being connected to the grids respectively of a pair of push-pull oscillator tubes 43 and 44, having grid tuning capacitors 39 and 40 and grid inductors 41 and 42 respectively connected thereto. The plate 8 is electrically connected to the junctions between the aforementioned grid inductors and grid capacitors, such that oscillation of the plate increases the capacity in the grid circuit of one of the tubes while simultaneously decreasing the capacity in the grid circuit of the other of the tubes. Accordingly, if the frequency of oscillations of tube 43 increases, the frequency of oscillations of tube 44 simultaneously decreases, and vice versa.

The tubes 43 and 44 of the oscillator circuit are observed, Fig. 2, to have inductors 47 and 48 in the plate circuits thereof tuned by capacitors 45 and 46 respectively. Coupled to coils 47 and 48 to derive energy therefrom are inductors 49 and 50 respectively, the inductor 50 being center-tapped, the ends thereof being connected to the control grids of a pair of triodes or other suitable tubes 51 and 52, the center tap of coil 50 being connected to one end of coil 49, the other end of coil 49 being connected to the negative terminal of bias battery 56, the positive terminal of battery 56 being connected to the cathodes of both of tubes 51 and 52. The anodes of tubes 51 and 52 are connected to the ends respectively of the primary coil 53 of a transformer having secondary 54, the center tap of the primary 53 being connected to a source of positive anode potential, not shown, the output of the secondary winding 54 being applied to a limiter of conventional design shown in block form, which may be similar to the limiter circuit of tube 17 of Fig. 1. The output of the limiter is fed to a discriminator of conventional design, which may be similar to the discriminator circuit of tubes 25 and 26, Fig. 1.

In the operation of the circuit of Fig. 2, the oscillations of tubes 43 and 44 are combined in the two transformers comprising coils 47—49, and 48—50, and in the balanced bias detector comprising tubes 51 and 52. The difference between the frequencies of tubes 43 and 44 appears in the transformer comprising coils 53 and 54, the output of coil 54 driving the limiter and thence the discriminator. The oscillator circuits of tubes 43 and 44 may be adjusted so that the difference frequency appearing in the transformer secondary 54 is the mean frequency of the discriminator. By adjusting the frequencies of tubes 43 and 44 to be very high compared to the difference frequency, a high gain may be realized across the output terminals 81—82 with either a high level or low level output, as will be readily understood by those skilled in the art.

Figure 3:
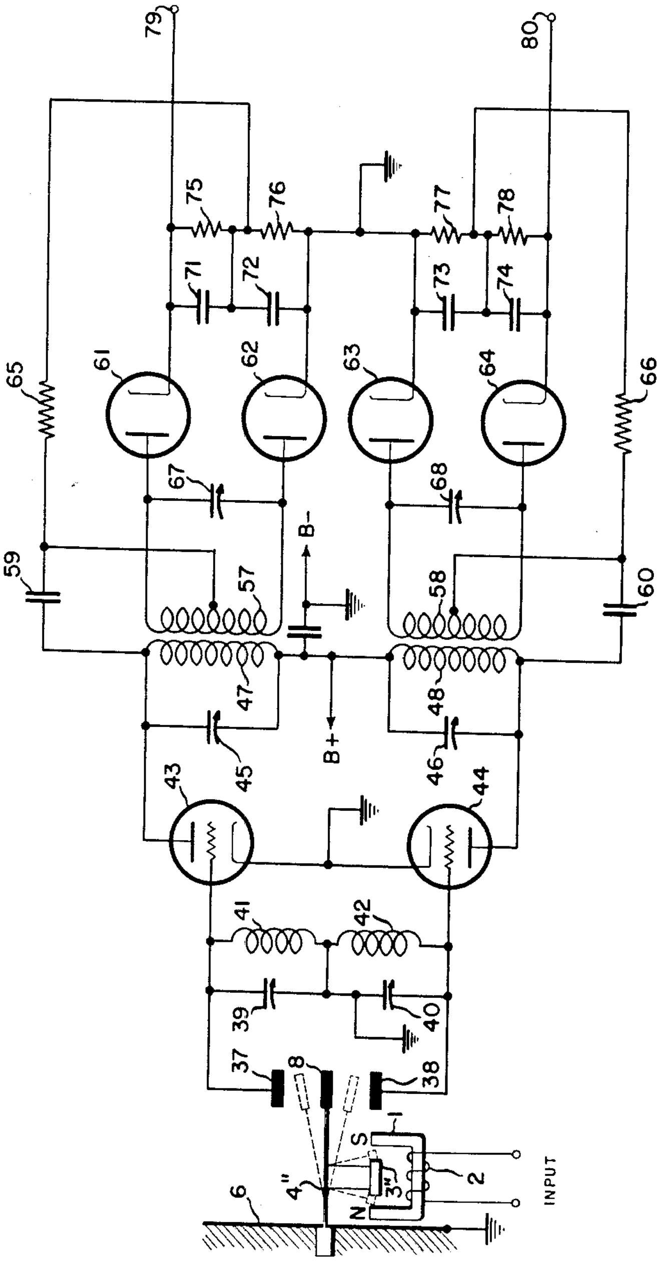
Fig. 3 is a schematic electrical circuit diagram of another modification of the apparatus of Fig. 1 and suitable for use with the present invention.

Reference is made now to Fig. 3, in which is shown another modification of the circuit of Fig. 1, in which two oscillators are also employed as in Fig. 2. The vibrating bar 4″ to which plate 8 is attached, is operatively connected to a magnetized bar 3″ arranged for vibratory movement within the core 1, the core having an excitation winding 2 connected to the input terminals. The two oscillator tubes 43 and 44 are arranged, as hereinbefore, with inductors 41 and 42 in their respective grid circuits, which, in conjunction with variable capacitors 39 and 40 respectively, determine the frequency to which the grid circuits are tuned. Plates 37 and 38 are connected to the respective grids of tubes 43 and 44, the movement of plate 8 attached to the vibrating reed or bar 4″ increasing the capacity of one grid circuit while simultaneously decreasing the capacity of the other grid circuit thereby decreasing the frequency of oscillations of one of the tubes while simultaneously increasing the frequency of oscillations of the other tube.

The anode circuits of the two tubes 43 and 44 have therein inductors 47 and 48 inductively coupled to inductors 57 and 58 respectively to transfer energy thereto, each of the inductors 57 and 58 being connected in a discriminator circuit of conventional design, the first discriminator circuit including inductor 57, capacitors 59 and 67, resistor 65, diodes 61 and 62, capacitors 71 and 72, and resistors 75 and 76 connected in the manner shown; and the second discriminator circuit including inductor 58, capacitors 60 and 68, resistor 66, diodes 63 and 64, capacitors 73 and 74, and resistors 77 and 78, the operation of the discriminators being conventional and similiar to that described in conjunction with tubes 25 and 26 of Fig. 1.

In the operation of the circuit of Fig. 3, the frequency modulated output of oscillator tube 43 is converted to a useful output signal in the discriminator comprising tubes 61 and 62, while the frequency modulated output of oscillator tube 44 is converted to a useful output signal in the discriminator comprising tubes 63 and 64, the outputs of the discriminators being combined by the circuit to yield a balanced output signal free from undesired even harmonic distortion, and which appears across the two output terminals 79 and 80.

It is contemplated that any suitable heater means be provided for heating the cathodes of the various electron discharge tubes, with any convenient energizing means associated therewith.

The invention contemplates the use, if desired, of a controllable degenerative coupling between the electrical output and the reed driving circuit.

The invention also contemplates the use, if desired, of a plurality of mechanical elements tuned to a progressive series of frequencies, and coupled to the frequency modulated oscillator detector systems to comprise a band-pass filter.

Whereas the invention has been shown and described with reference to a reed or bar for the vibratory mechanical element, this element may comprise, if desired, other means such, for example, as a pendulum, torsion pendulum, or galvanometer element.

Obviously many modifications and variations of the present invention are possible in the light of the above teachings. It is, therefore, to be understood that within the scope of the appended claims the invention may be practiced otherwise than as specifically described.

The invention may be manufactured and used by or for the Government of the United States of America for governmental purposes without the payment of any royalties thereon or therefor.

What is claimed as new and desired to be secured by Letters Patent of the United States is:

1. A selective amplifier comprising, in combination, an input circuit adapted to have an alternating current signal to be amplified applied thereto, a vibratory mechanical element tuned to the frequency of said signal, means energized from said input circuit and operatively connected to said element for setting said element into vibration, a generator of electric oscillations, means connected to said generator and controlled from said mechanical element for periodically varying the frequency of oscillations produced in the generator at a rate corresponding to the rate of vibration of the element, and demodulating means connected to said generator and energized therefrom, said demodulating means having an output circuit and being adapted to deliver an output signal of the same frequency as the signal in said input circuit and of substantially greater amplitude.

2. A selective A. C. voltage amplifier comprising, in combination, a tuned vibratory mechanical element, means energized by the voltage to be amplified for vibrating said element at the frequency of said voltage, oscillator means operatively connected to said mechanical element and adapted to have the frequency of oscillations thereof periodically varied by said element at the frequency of vibration thereof, and demodulating means energized from said oscillator means and adapted to supply an output voltage which is greater in amplitude and of the same frequency as the voltage to be amplified.

3. A selective voltage amplifier comprising, in combination, an input circuit, a tuned vibratory element, energizing means connected in said input circuit for setting said element in vibration, an oscillator circuit including a first capacitor and a second capacitor connected thereto for controlling the frequency of oscillations in the circuit, said second capacitor having the capacity thereof periodically varied by said vibratory element at a rate corresponding to the period of vibration of said element, and demodulating means energized from said oscillator circuit and adapted to supply an output voltage varying in amplitude at the frequency of the voltage applied to said input circuit.

4. A selective A.-C. voltage amplifier comprising an input circuit, a vibratory element, means connected to said input circuit for vibrating said element at the frequency of the A.-C. voltage in said input circuit, an oscillator circuit including a first capacitor and a second capacitor for controlling the frequency of oscillations therein, said second capacitor having a movable element operatively connected to said vibratory element for varying the capacity thereof periodically at a rate corresponding to the period of vibration of said element, means connected to said oscillator circuit for limiting the output of said oscillator circuit to a predetermined maximum value, and discriminator means operatively connected to said oscillator circuit and energized therefrom, said discriminator means being adapted to supply an output voltage varying in amplitude at the frequency of the voltage applied to said input circuit.

5. A selective A.-C. signal amplifier comprising a tuned vibratory mechanical element, means energized by the signal to be amplified for vibrating said element, oscillator means operatively connected to said element and to said oscillator means for varying the frequency of oscillations thereof at the frequency of vibration of said element, means limiting the output of said oscillator means to a predetermined value, and discriminator means energized from said oscillator means and adapted to supply an output signal which is greater in amplitude and of the same frequency as the A.-C. signal to be amplified.

6. A selective A.-C. voltage amplifier comprising an input circuit, a tuned vibratory element coupled to said input circuit and adapted to vibrate when the voltage in said circuit is varying periodically in amplitude at the natural frequency of vibration of said element, dual oscillator means comprising two tube circuits generating two voltages of predetermined frequencies, a tuning capacitor common to said circuits and so arranged that a variation in the capacitor increases the capacity in one of said circuits while simultaneously decreasing the capacity in the other of said circuits, means operatively connecting said capacitor to said vibratory element whereby the capacity of said capacitor is continually varied at the rate of vibration of said element thereby to modulate said dual oscillator means with respect to frequency, dual demodulating means connected to said dual oscillator means respectively, and a circuit common to said dual demodulating means and adapted to combine the outputs of the demodulating means and provide a voltage varying in amplitude at the frequency of the voltage in said input circuit.

7. Apparatus for coupling two electrical circuits including, in combination, dual oscillator means comprising two tube circuits generating two voltages of predetermined frequencies respectively, a tuning capacitor common to said circuits and arranged so that a variation in the capacitor increases the capacity in one of said circuits while simultaneously decreasing the capacity in the other of said circuits, an input circuit, a mechanical element energized from said input circuit and adapted to vibrate at the frequency of the voltage in said input circuit, means operatively connecting said capacitor to said element whereby the capacity of said capacitor is continually varied at the rate of vibration of said element, dual demodulating means connected to said dual oscillator means respectively, and a circuit common to said dual demodulating means for combining the outputs of the dual demodulator means and providing a voltage varying in amplitude at the frequency of the voltage in said input circuit.

8. Apparatus for coupling two A.-C. signal circuits comprising a tuned vibratory mechanical element, means operatively connected to one of said circuits for vibrating said element at the frequency of the signal in said one of the circuits, an oscillator included in the second one of said circuits operating at a higher frequency, means operatively connected to said element and to the oscillator for modulating the oscillator with respect to frequency of vibration of said element, and demodulating means connected in said second circuit and energized from said oscillator for producing an output A. C. signal of the same frequency as the signal in said first circuit.

References Cited in the file of this patent

UNITED STATES PATENTS

| | | |
|---|---|---|
| 1,223,306 | Anthony | Apr. 17, 1917 |
| 1,378,712 | Milnor | May 17, 1921 |
| 2,279,659 | Crosby | Apr. 14, 1942 |
| 2,353,162 | Kaltenbacher | July 11, 1944 |
| 2,368,036 | O'Brien | Jan. 23, 1945 |
| 2,379,897 | Floyd | July 10, 1945 |
| 2,407,270 | Harrison | Sept. 10, 1946 |
| 2,413,788 | Sargeant et al. | Jan. 7, 1947 |
| 2,423,616 | Rath | July 8, 1947 |
| 2,452,586 | McCoy | Nov. 2, 1948 |
| 2,456,420 | Jackson | Dec. 14, 1948 |
| 2,473,610 | Rieber | June 21, 1949 |
| 2,490,579 | Clewell | Dec. 6, 1949 |